United States Patent [19]

Shu

[11] Patent Number: 4,834,182

[45] Date of Patent: May 30, 1989

[54] POLYMERS FOR OIL RESERVOIR PERMEABILITY CONTROL

[75] Inventor: Paul Shu, Princeton Junction, N.J.

[73] Assignee: Mobil Oil Corporation, New York, N.Y.

[21] Appl. No.: 676,377

[22] Filed: Nov. 29, 1984

[51] Int. Cl.⁴ .......................................... E21B 33/138
[52] U.S. Cl. ..................................... 166/295; 166/294
[58] Field of Search ................ 166/275, 294, 295, 281

[56] References Cited

U.S. PATENT DOCUMENTS

| | | | |
|---|---|---|---|
| 3,909,423 | 9/1975 | Hessert et al. | 166/275 X |
| 3,981,363 | 9/1976 | Gall | 166/294 X |
| 4,009,755 | 3/1977 | Sandiford | 166/270 |
| 4,040,484 | 8/1977 | Hessert | 166/294 |
| 4,069,869 | 1/1978 | Sandiford | 166/270 |
| 4,413,680 | 11/1983 | Sandiford et al. | 166/270 |

Primary Examiner—George A. Suchfield
Attorney, Agent, or Firm—Alexander J. McKillop; Charles J. Speciale; Stanislaus Aksman

[57] ABSTRACT

Improved polymer gels for oil reservoir permeability control have a continuous, cross-linked polymer phase having a relatively low density of cross-linking with domains of clustered, high density cross-linking. The clustered high density cross-linkings contribute to the gel's shear stability and gel strength while the continuous, low density phase contributes to good injectivity. Gels of this kind are produced by cross-linking a base polymer with a relatively low density of cross-linking sites with a reinforcing polymer having a higher cross-linking site density. Suitable polymers have ligand groups which are capable of forming coordination cross-linkages with polyvalent metals, especially chromium and include polyacrylamides as base polymers and polyacrylic acids as reinforcing polymers.

45 Claims, No Drawings

POLYMERS FOR OIL RESERVOIR PERMEABILITY CONTROL

FIELD OF THE INVENTION

This invention relates to polymers which are useful for the control of permeability in subterranean oil-bearing formations and more particularly, to polymers of this kind which have improved gel strength, injectivity and shear stability. The invention also relates to the control of permeability in oil reservoirs using these polymers and to production methods using them.

BACKGROUND OF THE INVENTION

In the production of oil from subterranean oil reservoirs by various flooding techniques, especially waterflooding, it has become a common expedient to add various polymeric thickening agents to the water in order to increase its viscosity to a point where it approaches that of the crude oil which is to be displaced so as to improve the displacement of the oil from the reservoir. The use of polymers for this purpose is often stated to be for mobility control.

Another problem which arises in the various flooding processes is that different strata or zones in the reservoir often possess different permeabilities so that displacing fluids enter the high permeability or "thief" zones in preference to zones of lower permeability where significant quantities of oil may be left unless measures are taken to plug the high permeability zones wholly or partly and so divert the displacing fluid into the low permeability zones. Mechanical isolation of the theif zones has been tried but vertical communication among reservoir strata often renders such measures ineffective. Physical plugging of the high permeability zones by cements and solid slurries has also been attempted with varying degrees of success but here, the most serious drawback is the possibility of permanently closing still productive horizons.

From these early experiences, the desirability of designing a viscous slug capable of sealing off the most permeable layers so that the floodwater would be diverted to the underswept, tighter regions of the reservoir, became evident. This led to the use of oil/water emulsions, gels and polymers for controlling the permeability of the formations in a process frequently referred to as a "profile control", a reference to the control of the vertical permeability profile of the reservoir. Profile control agents which have been proposed have included oil/water emulsions, gels, e.g. lignosulfonate gels and polymers, with polymers being the most extensively applied in recent years.

Among the polymers so far examined for improving waterflood conformance are polyacrylamides, polysaccharides, celluloses, furfural-alcohol and acrylic/epoxy resins, silicates and polyisocyanurates. A major part of this work has been conducted with the polyacrylamides.

Polyacrylamides have been used both in their normal, noncrosslinked form as well as in the form of crosslinked metal complexes, as described, for example, in U.S. Pat. Nos. 4,009,755; 4,069,869 and 4,413,680. In either form, the beneficial effects derived from these polyacrylamides seem to dissipate rapidly due to shear degradation during injection and sensitivity to reservoir brines. To overcome these problems and to achieve deeper penetration into the reservoir, dilute solutions of these polymers have sometimes been injected first and then complexed in situ. For example, in one such process, three sequential injection steps are employed: cationic polyacrylamides are injected first for strong adsorption and anchoring onto the generally anionic sites of the reservoir rock surfaces, followed by chelation with aluminum ions provided by aluminum citrate or with chromium ions generated by the in situ reduction of dichromate ions and finally, anionic polyacrylamides are injected for the formation of the desired cationic polymer-metal ion-anionic polymer complexes (J. E. Hassert, and P. D. Flemming, III, "Gelled Polymer Technology for Control of Water in Injection and Production Wells," *3rd Conference on Tertiary Oil Recovery*, U. of Kansas, Lawrence, 1979).

Another group of polymeric thickeners which has received considerable attention for use in waterflooding is the polysaccharides, particularly those produced by the action of bacteria of the genus Xanthomonas on carbohydrates. For example, U.S. Pat. Nos. 3,757,863 and 3,383,307 disclose mobility control by the use of polysaccharides in the presence of polyvalent metal ion crosslinking agents. U.S. Pat. No. 3,810,882 discloses the possibility of using certain reducible complex metal ions as cross-linking agents for polysaccharides. U.S. Pat. Nos. 4,078,607 and 4,104,193 describe a method for improving the efficiency of waterflooding operations by a particular polysaccharide prehydration technique. U.S. Pat. No. 4,413,680 describes the use of cross-linked polysaccharides for selective permeability control in oil reservoirs.

U.S. Pat. No. 3,908,760 describes a polymer waterflooding process in which a gelled, water-soluble Xanthomonas polysaccharide is injected into a stratified reservoir to form a slug, band or front of gel extending vertically across both high permeability and low permeability strata. This patent also suggests the use of complexed polysaccharides to block natural or man made fractures in formations. The use of polyvalent metal ions for cross-linking polysaccharides and other polymers including polyacrylamides, which are to be used for permeability control is described in U.S. Pat. Nos. 4,009,755, 4,069,869 and 4,413,680.

One problem which has continually attended the use of polymeric mobility and profile control agents is that thickened aqueous solutions, e.g. polysaccharide solutions, may be more difficult to inject into the reservoir than less viscous solutions. Also, the shear conditions encountered during injection may degrade the polymer and reduce its effect when it enters the reservoir. To overcome the injectivity problem, U.S. Pat. No. 3,208,518 proposed the use of polymer solutions of controlled pH which undergo a delayed increase in viscosity after the solution enters the formation and the pH changes by neutralization of acidic or basic constituents in the solution by materials present in the reservoir.

The problem of retaining good gel strength as well as good injectivity has, however, remained. To a great extent, the possession of good gel strength has been considered inimicable to good injectivity because gel strength is dependent upon the possession of a well-developed gel structure whereas injectivity requires that the polymer function move as a fluid, implying the absence of gel structure. Thus, polymer gel selection has remained something of a compromise and no adequate solution to this problem has so far been achieved. To this should be added the problem of shear stability. Although many of those polymers undergo reversible shear thinning, the degradation brought about by shear forces may not be wholly reversible so that after a polymer has been pumped under pressure down the well into a reservoir, it may be far less effective for its intended function than it was prior to injection. Thus, there is a need to develop polymers with good gel strength, injectivity, shear stability and other rheological properties.

SUMMARY OF THE INVENTION

According to the present invention, the rheological properties of a polymer which is useful for permeability control in oil recovery operations are controlled by forming cross-linkages of varying density in the polymer. The resulting cross-linked polymers are characterized by the possession of good shear stability and good injectivity. In morphological terms, microdomains of high cross-linking density are suspended in a continuous phase of low cross-linking density. The regions of high cross-linking density contribute to the strength and shear stability of the gel and the regions of low cross-linking density to its injectivity.

The polymers may be produced by cross-linking a polymer having a high density of cross-linking sites with a polymer having a low density of cross-linking sites. Generally, the polymers are those which form gels by the formation of coordinate cross-linkages with ions of polyvalent metals such as chromium. Polymers of this type include synthetic polymers such as acrylic polymers, e.g. polyacrylic acid and polyacrylamide, and polymers derived from natural sources such as the polysaccharides.

DETAILED DESCRIPTION

General Considerations

Polymer gels are used for permeability profile control in oilfield flooding operations for enhanced oil recovery. In flooding operations, a liquid, usually water is injected into the subterranean, oil-bearing formation through an injection well which extends from the surface of the earth down into the formation. A production well also extends into the formation at an offset or horizontal distance from the injection so that, as the flooding liquid is injected into the formation through the injection well, it displaces the oil towards the production well, from which it may be recovered. Invariably, more than one injection well and more than one production well will be used in order to cover the oilfield adequately and recovery is maximized; various arrangements of injection and production wells are used to this end, e.g. linear arrangements to form a line drive, five spot, inverted five spot, seven spot, inverted seven spot, all of which is established in practice.

The polymer gels which are suitable for profile control should have good gel strength, shear stability and good injectivity. The gel strength is required in order that the polymer will be able to resist the pressures which will be set up in the formation once the polymer has been placed in the formation and the flooding process started; because the flooding process relies on the injection of the flooding liquid at the injection well, substantial pressures acting upon the rear of the gelled polymer plugging the more highly permeable zones may be set up. If the strength of the gelled polymer is insufficient to resist the resulting stresses, it may break up and lose its effectiveness. Shear stability is required because during the injection, the polymer solution will be subjected to shear stresses in the pumping and well equipment and as it moves through the formation. Although shear-thinning behavior is desirable, so that the polymer solution becomes less viscous during the injection process, it should be reversible in nature so that when the shear forces are removed, the gel will revert to its original viscosity and structure, or substantially so, in order that it may then effectively plug the high permeability regions of the formation. Injectivity, is, to a certain extent, the inverse of gel strength since gel strength is related to the performance of the polymer as a solid whereas injectivity requires that it should behave as a liquid. Improvement in gel strength has, therefore, often been associated with deterioration in injectivity and the use of viscous, high gel strength polymers has often required high injection pressures with the concomitant risks of polymer deterioration under the shear forces present together with that of fracturing the formation.

The polymers used in flooding operations have, as previously mentioned, frequently been polymers which have been cross-linked, usually by the use of polyvalent metal ions, especially chromium, which form coordinate bonds with ligands on the polymers. The degree of cross-linking affects the properties of the polymers, an increase in the degree of cross-linking generally resulting in an improvement in the solid state properties of the polymer gel. Gel strength can therefore be improved by denser cross-linking to produce a more rigid gel network but, if this is done, injectivity will suffer because of the increased stiffness. Also, under high shear conditions, the gel structure will break down rather than deform, indicating shear instability. Thus, up to the present, the formulation of these polymer gels has been a compromise.

According to the present invention, the polymer gel network is constructed by clustering the cross-linkages to form high cross-linking density regions within the gel. The gel therefore has a morphology of isolated domains (microdomains) of high cross-linking density in a continuous phase of low cross-linking density. At a fixed total number of cross-linkages, the continuous phase will have a lower cross-linking density than a uniformly cross-linked gel; because of this, the gel will be more deformable than the gel which is uniformly cross-linked. Better injectivity will therefore be obtained. The multiple cross-linkages in the high density regions will, however, result in strong cross-linking and a higher gel strength will be obtained. The gel therefore has the desirable attributes of both a highly cross-linked and a less highly cross-linked structure. By suitable choice of cross-linking densities and the respective proportions of the high and low density linkages, the properties of the gels may be varied widely and controlled in accordance with their specific utilities. In particular, the gel properties of the polymer may be adjusted according to the properties of the formation into which it is to be injected: if high gel strength is required, this may be secured without excessive compromise of injectivity or shear stability.

The cross-linking density is controlled by the use of two or more polymers which are linked together by means of a common cross-linking agent. One of the polymers, referred to in this specification as the "base" polymer, has a relatively low density of cross-linking sites. The other polymer, which is generally used in a smaller amount, and is referred to in this specification as the "reinforcing" polymer, has a relatively high density of cross-linking sites. When the two polymers are cross-linked together by the common cross-linking agent, zones or domains of clustered, high density cross-linkages are formed within a continuous phase of low cross-linking density. The relative density of the cross-linking sites may be determined by the number of potential ligand or donor sites on each macromolecule of the two polymers.

Polymers

The polymers which are used are gel-forming polymers which are capable of cross-linking to provide the desired gel structure. Generally, because the cross-linking is carried out by the formation of coordinate cross-linkages with polyvalent metal cross-linking agents such as chromium, aluminum, zirconium or titanium, the polymer should contain donor atoms such as oxygen, nitrogen or sulfur in ligand groups, e.g. carboxylate, hydroxyl, amido, which aaree capable of forming the required cross-linkages by coordination with the metal. However, the formation of the requisite cross-linkages by other cross-linking mechanisms is by no means to be excluded. Polymers which are capable of forming the preferred coordination cross-linkages may be synthetic in origin or may be derived from natural sources, for example, the polysaccharides such as the xanthan polysaccharides. However, because the present method requires the gels to be formed from polymers of known and controllable properties, particularly with respect to their cross-linking ability, synthetic polymers will normally be preferred because their properties are more readily known and capable of easy modification than the polymers of natural origin or those derived from natural sources by biological processes.

Suitable synthetic polymers include acrylic polymers, e.g. polyacrylic acid, polyacrylic acid esters, polyacrylamide, partly hydrolyzed polyacrylamides, substituted polyacrylic acids such as polymethacrylic acid and polymethacrylic acid esters; copolymers of unsaturated carboxylic acids such as acrylic acid or methacrylic acid with olefins such as ethylene, propylene and butylene and their oxides; polymers of unsaturated dibasic acids and anhydrides such as maleic anhydride; and their copolymers with other monomers such as ethylene, propylene, styrene and methylstyrene, vinyl polymers, especially polyvinyl acetate and polyvinyl alcohol and polyalkylene oxides, e.g. as described in U.S. Pat. No. 4,413,680. Other exemplary synthetic polymers are described in U.S. Pat. No. 3,208,518 to which reference is made for a description of these polymers.

If the polymer does not possess appropriate functional groups for coordinating with the metals, they may be introduced by the use of grafting techniques or by reaction of a pre-formed polymer with a suitable reagent for introducing the desired groups.

Although less preferred, polymers of natural origin and biopolymers may be used provided that they contain the appropriate cross-linking site densities. Biopolymers which may be used include the polysaccharides produced by the action of bacteria of the genus Xanthomonas on a carbohydrate. The Xanthomonas polysaccharides, their methods of preparation, their use in various applications in the petroleUm industry are well known and are described, for example, in U.S. Pat. Nos. 3,243,000; 3,305,016; 3,208,518; 3,810,882 and 4,413,680, to which reference is made for disclosures of these materials, their preparation and their use. Other polymers of natural origin that may be used include cellulose polymers, e.g. the hydroxyalkyl celluloses and carboxyalkyl celluloses and their alkali metal and ammonium salts, as described in U.S. Pat. No. 4,413,680, to which reference is made for a detailed description of these polymers. The polymers of natural origin will not normally be selected according to their molecular weight since their properties are determined as much by their origin and structure. Thus, these polymers will normally be selected for their chemical and physical properties and their utility in the process without reference to their molecular weight as such.

A particular polysaccharide which is commercially available and is preferred for use in the present invention is the ionic polysaccharide B-1459 produced by fermentation of glucose with the bacterium *Xanthomonas campestris* NRRL B-1459, U.S. Department of Agriculture. This polysaccharide is produced by culturing the bacterium *Xanthomonas campestris* in a well aerated medium having a pH of about 7 which contains commercial glucose, organic nitrogen sources, dipotassium hydrogen phosphate and appropriate trace elements. This polymer is available from the Kelco Chemical Company under trade name "Kelzan" from Pfizer under the trade name "Flocon" as well as from other commercial sources.

Other water-soluble polymers which may form gels by cross-linking with metal cations include cellulose derivatives such as the carboxyalkyl celluloses and hydroxyalkyl celluloses, e.g. as described in U.S. Pat. Nos. 4,009,755, 4,069,869 and 4,413,680 to which reference is made for a description of those polymers.

The potential ligand or donor sites on the polymer macromolecules are generally sites containing oxygen, nitrogen or sulfur atoms, of which oxygen tends to form the strongest coordinate bonds with the cross-linking agent and is, for this reason, preferred. As previously mentioned, the density of the potential cross-linking sites will be the proportional to the number of functional ligand groups on the macromolecule. This will normally be known from the manner in which the polymer is prepared, e.g. ratio of monomers if it is a copolymer or, alternatively, it may be determined analytically, e.g. by titration and referred to the chain length of the polymer. Certain polymers, e.g. partly hydrolyzed polyacrylamides, may have more than one type of potential ligand site but because these may differ in their ability to form cross-linking coordinate bonds, one type of site may function to the exclusion of the other in the presence of limited amounts of the cross-linking agent. In such cases, the site density will approximate to the site density of the more active ligand groups, e.g. the carboxyl oxygens on partly hydrolyzed polyacrylamides, although if conditions are suitably adjusted, for example, by the use of sufficient cross-linking agent to react with the less reactive donor atoms as well as the more reactive ones or by the use of longer reaction times. The number of potential donor sites per polymer molecule may be changed, in certain cases, by modifying the functional groups in the polymer. For example, the pendant amide groups on a polyacrylamide may be hydrolyzed, e.g. with sodium hydroxide to convert them to carboxylate groups which are more highly reactive for cross-linking than the original amide groups. Similarly, ester groups, e.g. as in acrylate or methacrylate esters may be hydrolyzed to carboxyl groups or, if a lower active cross-linking site density is desired, carboxylate groups may be converted to amide groups or ester groups.

The base polymer has a relatively low cross-linking site density compared to that of the reinforcing polymer. A cross-linking site density of 1 to 10 percent of the functional groups in the base polymer will be typical and often, from 1 to 5 percent will be sufficient to form a stable gel. The minimum site density for the cross-linking polymer will be set by that of the base polymer because obviously, a difference is required in order to create the desired morphology. The maximum will be 100 percent, as in the acrylic acid homopolymers where all functional groups are available as potential cross-linking sites, even though the amount of cross-linking agent used may preclude the formation of cross-linkages at all available sites. In typical reinforcing polymers, the site density may be as low as 20 percent of all functional groups and site densities of 30 to 50 percent will not be uncommon, e.g. as in the partly hydrolyzed polyacrylamides.

The polyacrylamides and partly hydrolyzed polyacrylamides are particularly useful polymers for preparing the gels because the carboxamide sites on the polyacrylamide may be converted to carboxylate sites by hydrolysis, e.g. with an alkali such as sodium hydroxide, to vary the proportion of carboxylate sites, either in the acid or salt form, to carboxamide sites. The carboxylate sites are, as described below, more active for cross-linking than the carboxamide sites and therefore in the presence of a limited amount of cross-linking agent, may form cross-linkages to the exclusion of the carboxamide sites. The density of cross-linking sites on these polymers may therefore be readily varied by controlling the degree of hydrolysis of the polyamide: if a highly hydrolyzed polyamide is used, the carboxylate site density will be relatively high and the polymer may be used as a reinforcing polymer to form cross-linkages with a high density of cross-linking. Conversely, if the polyamide is hydrolyzed to a lesser extent, the proportion of carboxylate groups will be fewer and the cross linking site density will be lower; polymers like this may be used as base polymers. Similarly, the polyacrylic esters may be hydrolyzed to varying extents to form the corresponding polyacrylic acids which are more active for cross-linking. Thus, the partly hydrolyzed polyacrylamides and polyacrylic acid esters of relatively high carboxylate content, e.g. 30 to 50 percent, are suitable as reinforcing polymers while the corresponding polymers with a relatively low carboxylate content, e.g. 2 to 5 percent are suitable as base polymers. Copolymerization of acrylic acid or substituted acrylic acids such as methacrylic acid with acrylamide by conventional procedures may also be used to produce polymers with the desired degree of cross-linking site density.

Because the objective is to produce a continuous phase with a relatively low density of cross-linking sites with suspended microdomains of higher site density, the reinforcing polymer will generally be of shorter chain length, i.e. lower molecular weight, than the base polymer. Molecular weight (number) ratios from 10,000:1 (base polymer:reinforcing polymer) to 5:1, preferably from 5,000:1 to 10:1, will normally be suitable although molecular weight will generally be a less significant factor in itself than the cross-linking site densities of the polymers. The molecular weight of the synthetic polymers will generally be at least $0.1 \times 10^6$, with the base polymer normally having a higher molecular weight than the reinforcing polymer. Generally, the base polymer will have a molecular weight of at least $1 \times 10^6$ and preferably from $5 \times 10^6$ to $20 \times 10^6$. The reinforcing polymers will generally have a molecular weight in the range of $1 \times 10^3$ to $10 \times 10^6$, generally at least $2 \times 10^3$ and typically not above $0.1 \times 10^6$. When the molecular weight of the reinforcing polymer is relatively low compared to that of the base polymer, the microdomains of clustered cross-linkages will be smaller and more evenly distributed throughout the gel structure; conversely, as the molecular weight ratio of the two polymers diminishes, the domains will become llarge and there will be fewer of them.

The relative proportions of the base and reinforcing polymers should be selected in order to arrive at the desired balance of properties in the final polymer gel and in making the selection, due consideration should be given to the cross-linking site densities and reactivities of the two polymers. This may be explained as follows, taking a partly hydrolyzed polyacrylamide as an example of the base polymer, a polyacrylic acid as the reinforcing polymer and a chromium compound as the cross-linking agent. In this system, the carboxylate groups will function as the reactive sites:

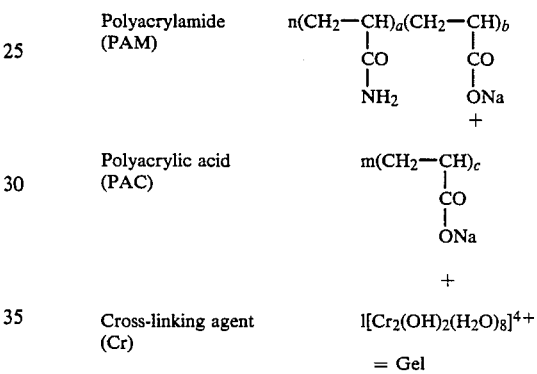

There are three possible cross-linking arrangements with this system because the polymers may obviously cross-link within themselves as well as with each other:
1. PAM—Cr—PAC
2. PAC—Cr—PAC
3. PAM—Cr—PAM All three may be formed within a particular gel, the stoichiometry and reactivity of the starting materials determining the gel type formed. The dominant species will influence the gel properties to the greatest extent. When a Type 1 species predominates, the clustered cross-linking system is formed and the gel will have a balance of solid state and liquid state properties. At a constant concentration of PAM and Cr, high concentrations of PAC will react preferentially with most of the Cr and this will result in a densely cross-linked polymer of Type 2 which is unstable subject to phase separation. Too low a concentration of PAC will lead to a Type 3 polymer which leads to a conventional, homogeneously cross-linked gel with no improvement in the desired rheological properties. Similar considerations clearly apply to other systems, indicating the need to adjust not only the reactivities but also the proportions of the polymers according to the properties desired of the final gel—in itself a factor dependent upon the reservoir which is to be treated and the conditions which are likely to be encountered during the flooding operation, e.g. high formation porosity and high differential flooding pressures require high gel strength whereas low formation porosity requires good injectivity to ensure that the polymer penetrates the reservoir to the desired extent. Since all these factors will vary unpredictably, no more exact indication can be given here, but as a general guide, the reinforcing polymer will be present in an amount of about 0.1 to 20, preferably 2 to 10 and typically 2 to 5, weight percent of the amount of the base polymer; in many cases 0.1 to 5 weight percent will be sufficient although, as previously stated, this will depend upon the properties of the two polymers and of the conditions which will be encountered during their use.

Cross-Linking Agents

As mentioned above, the preferred cross-linking system is by the formation of coordination bonds between donor atoms on the polymers and polyvalent metal cross-linking agents. In principle, any metal compound capable of forming two or more of the desired coordination bonds with the polymers could be used but generally, the metal will be aluminum, zirconium or a metal of the first series of transition metals (Sc-Zn). The preferred metal, however, is chromium (III) because it readily forms complexes with most common ligands. Zirconium (IV) is another favored metal. Certain metals will coordinate favorably only with certain ligands, e.g. Ti coordinates favorably only with hydroxyl and because of this these metals should be used only with polymers containing appropriate ligands, e.g. titanium-containing cross-linking agents should be used only with polymers containing hydroxyl functional groups such as polyvinyl alcohol and partly hydrolyzed polyvinyl acetate.

The metal is used in the form of a compound which may or may not be water-soluble. The compound may be, for example, a simple salt such as a sulphate, chloride or nitrate salt, e.g. $Al_2(SO_4)_3$, $Cr_2(SO_4)_3$, $NiSO_4$, $CrCl_3$, basic salts, aquo complexes of polyvalent metal salts, salts or oxides or hydroxides of the metals, e.g. the various chromium hydroxides produced by reacting alkalies with chromium salt solutions in various ratios. Chromium hydrosols, e.g. those produced by heating aqueous solutions of chromium salts in the presence of sulfate ions may also be used. Another source of chromium cross-linking agents is the chromium redox system in which chromium is reduced from its higher oxidation states, specifically the Cr (VI) and Cr (VII) oxidation states as in chromate or dichromate salts, using a reducing agent such as a sulfite, hydrosulfite, bisulfite, metabisulfite or thiosulfite salt or a salt of a metal in a lower oxidation state, e.g. ferrous sulphate or an organic compound such as thiourea, ascorbic acid, glucose, citric acid, thioacetamide, hydroquinone or hydrazine.

The amount of cross-linking agent should be selected on a stoichiometric basis to be sufficient to cause the desired degree of cross-linking between the polymers. Generally, the amount will be about 1 to 10 percent by weight of the polymer with chromium cross-linkers (as Cr).

Operation

The polymer gels will normally be formed by forming a solution or dispersion of the base polymer and adding the reinforcing polymer and then the cross-linker. The reinforcing polymer and the cross-linker may be added simultaneously or, alternatively, the cross-linker may be added first to the base polymer, followed by the reinforcing polymer after a certain degree of cross-linking has taken place in the base polymer itself. This method ensures that a cross-linked continuous phase will be formed but provided that the amounts and reactivities of the reinforcing polymer and the cross-linker are suitably selected, no undue problems should be encountered in this respect.

When the gel has been formed, it may be injected into the formation in the normal way, through the injection well. Because the gels have good rheological properties and are relatively shear stable, injection may be delayed until the cross-linking and gel formation is complete although there is usually no disadvantage to prompt injection if gelation is slow to occur. Once the polymer has been properly placed in the formation, i.e. in the more highly permeable regions, and sufficient time has been allowed to elapse for the full gel strength to be established, flooding operations may be carried out in the normal way. The amount of polymer used to form the gel will depend upon a number of factors including the ultimate gel strength desired, formation porosity and the properties of the polymers used. It is therefore not possible to indicate the exact amount of polymer to be used in all applications at all times. However, as a general guide, the total polymer content of the gel will generally be from 500 to 10,000 ppm, preferably 1,000 to 5,000 ppm, by weight. The amount of cross-linking agent will similarly vary according to the properties desired of the gel but as a general guide will typically be 10 to 200, preferably 10 to 150 ppm, by weight of the preferred chromium cross-linking agents. In general, the amount of gel which may be injected into the formation may be from 10 to 100 percent of the pore volume of the high permeability stratum or strata. The blocking of the more permeable flow channels by the gel diverts the following looding liquid to the under-swept portions of the reservoir and, in turn, to improved oil recovery.

EXAMPLES 1-4

Four polymer gels were prepared from a high molecular weight, partly hydrolyzed polyacrylamide, approx. 1 percent hydrolyzed, molecular weight: $10 \times 10^6$ at a level of 2000 ppm in 2 percent NaCl aqueous solution. Various concentrations of an acrylic acid homopolymer, molecular weight approx 400,000, were added to the polyacrylamide solution and cross-linking was effected with 90 ppm. $Cr(OH)^{2+}$ produced by the reaction of $Cr(NO_3)_3$ with NaOH at a 1:1 molar ratio.

The gels were as follows:

Example 1. This is the base polymer solution which has a low degree of viscosity and structure and is un-cross-linked (no Cr was added).

Example 2. This gel was prepared by cross-linking the base polymer with 90 ppm of Cr (III). This gel has homogeneously distributed cross-links.

Example 3. This gel was prepared by incorporating 30 ppm of polyacrylic acid (as Na salt) into the Example 2 composition. It had a cloudy appearance on gelation with 90 ppm Cr (III), suggesting a phase separation of micro-domains of high and low cross-linking densities.

Example 4. This gel was prepared by the cogelation of 60 ppm polyacrylic acid with the basic composition (Example 1).

The rheological properties of the gels were measured with a Rheometrics (trademark) fluid rheometer at shear rates of 1 $sec^{-1}$ and 5 $sec^{-1}$. The values of the storage modulus, G', and the ratio of the loss modulus, G'', to the storage modulus, G', Tan δ, were also determined (ref: Viscoelastic Properties of Polymers, J. D. Ferry, 3rd. Ed., John Wiley and Sons, New York 1961, Chapter 1).

The compositions of the gels and their rheological properties are given in Table 1 below.

TABLE 1

Rheological Properties of Polymer Gels

| Ex. No. | PAC (ppm) | $\eta$, cp 1 sec$^{-1}$ | $\eta$, cp 5 sec$^{-1}$ | $\eta^*$ 1 R/S | G' dyne/cm$^2$ 6 Percent Strain | Tan $\delta$ $\sigma$ 1 R/S 6 Percent Strain |
|---|---|---|---|---|---|---|
| 1 | 0 (NoCr) | 16.1 | 13.9 | 14.4 | 0.064 | 1.69 |
| 2 | 0 | 3663 | 989 | 527 | 5.18 | 0.19 |
| 3 | 30 | 3269 | 937 | 584 | 5.8 | 0.13 |
| 4 | 60 | 1837 | 657 | 254 | 2.48 | 0.20 |

The low degree of structure of the base polymer (Ex. 1) was confirmed by the low G' value of 0.084 dynes cm$^{-2}$. The effects of cross-linking the base polymer are demonstrated by Example 2 as there the G' increased by 80 times and viscosity increased more than 200 fold over Example 1. With its high G' and low tan $\delta$ the gel of Example 2 may be classified as a homogeneously cross-linked, elastic material with a high degree of structure.

Compared to Example 2, the gel of Example 3 had an even higher G' and lower tan $\delta$, suggesting higher elasticity and structure but these did not increase its viscosity; on the contrary, this was lower than that of Example 2. The rheological properties of the Example 3 gel indicate that it should have the high shear stability and good injectivity characteristic of a cluster cross-linked gel.

The rheological properties of the Example 4 gel showed a sharp drop in the value of G' and viscosity relative to Example 3, indicating that the gel is not as strong as that of Example 3. The increased amount of polyacrylic acid may have caused over cross-linking in the high density domains, reducing the cross-linking density in the continuous phase to a low value, indicating the desirability of balancing proportions and reactivities to obtain the desired combination of properties in the final gel. The gels of Examples 2-4 were subjected to a shear field of 3000 sec$^{-1}$ to simulate the conditions in an injection wellbore. The gels were pumped through an orifice of 1/64 inch (0.4 mm.) radius at a rate of 0.15 ml. sec$^{-1}$. The shear field applied can be calculated by the equation below as 3000 sec$^{-1}$.

$$r = \frac{4Q}{\pi R^3}$$

where $Q$ = flow rate, ml/sec $R$ = radius of orifice, cm.

The rheological properties of the sheared material were measured again to evaluate the shear stability.

The results of the shear testing ar given in Table 2 below.

TABLE 2

Shear Stability of Gels 2.1 Viscosity Change*

| Gel Sample No. | Visc., cp b | Visc., cp a | Percent Change |
|---|---|---|---|
| 2 | 478 | 347 | −27 |
| 3 | 530 | 508 | −4 |
| 4 | 192 | 141 | −27 |

2.2 Storage Modulus Change

| Gel Sample No. | G'$_b$, dynes/cm$^2$ | G'$_a$*, dynes/cm$^2$ | Percent Change |
|---|---|---|---|
| 2 | 4.7 | 3.4 | −28 |
| 3 | 5.25 | 5.0 | −4.8 |
| 4 | 1.90 | 1.38 | −27.4 |

Note
*At 26 percent strain, 1 radian sec$^{-1}$; subscript b = before shearing, a = after shearing The gel of Example 3 is the most stable to shear. Both viscosity and structure, as indicated by the storage modulus, were essentially unchanged, while losses of 25-30 percent were experienced by the gels of Examples 2 and 4. These results show that good shear stability may be obtained in a gel of good structure. The effectiveness of the gels in blocking porous media was tested by pumping them through a sandpacked column of 610×9.5 mm ID (2 ft.×0.375 inch ID) at a rate of 10 ml/hr. The sandpack material used was 40-325 mesh (Tyler) (approx 0.3-0.04 mm. aperture) Berea sand. The pressure-injecting volume (measured as pore volume) relationship was obtained to evaluate its performance.

The gels of Examples 2, 3 and 4 all produced considerable pressure drop across the sandpack. However, only Examples 3 and 4 caused blockage. Pressure increase by Example 2 tapered off at one pore volume of gel injection, suggesting that the gel broke through the sandpack and the pressure drop produced was probably caused by viscous flow of gel. Example 4 blocked the sandpack prematurely at about 0.75 pore volume of gel injection. The blockage was caused by a filter cake formation at the entrance of sandpack by the overcrosslinked gel cluster. The sandpack was blocked by Example 3 at about 1 pore volume of gel injection. It was also shown by the sharp rate of pressure increase. Therefore, the gel of Example 3 not only can penetrate dep into the sandpack but also can effectively block it.

The results of the shear test show that the gel of Example 3 is the most stable, losing little or no viscosity or storage modulus at a shear rate of 3000 sec$^{-1}$. The outstanding performance of gel Example 3 is attributed as the result of clustered cross-linking from a balanced composition of base polymer, reinforced polymer and cross-linker.

Based on the principles of this invention, other polymers with the combination of a low cross-linking site polymer, a high cross-linking site polymer and a cross-linker capable of reacting with both polymers may constitute gels with unique performance, rheology and morphology.

I claim:

1. A method for controlling the permeability of a subterranean formation by the injection of an aqueous polymer gel into the formation through an injection well extending into the formation from the surface of the earth, in which the aqueous polymeric gel comprises a heterogeneous gel prepared prior to the injection thereof into the formation by cross-linking a mixture of a base polymer having a relatively low density of cross-linking sites and a reinforcing polymer having a relatively high density of cross-linking sites, the resulting gel having a cross-linked polymeric structure having isolated regions of relatively high density cross-linking in a continuous phase of relatively low density cross-linking.

2. A method according to claim 1 in which the base polymer comprises a polyacrylamide having a relatively low proportion of carboxylate functional groups.

3. A method according to claim 2 in which the reinforcing polymer comprises polyacrylic acid, a partly hydrolyzed polyacrylamide or a partly hydrolyzed polyacrylic acid ester.

4. A method according to claim 1 in which the cross-linkages are coordinate cross-linkages extending between ligand polymers and polyvalent metals as cross-linking agents.

5. A method according to claim 4 in which the polyvalent metal is chromium (III).

6. A method according to claim 1 in which the gel has a total polymer content of 500 to 10000 ppm.

7. A method according to claim 6 in which the gel has a total polymer content of 1000 to 5000 ppm.

8. A method according to claim 7 wherein the base polymer has a cross-linking site density of 1 to 10 percent of the functional groups.

9. A method according to claim 8 wherein the base polymer has a cross-linking site density of 1 to 5 percent of the functional groups.

10. A method according to claim 9 wherein the reinforcing polymer has a cross-linking site density of at least 20 percent of the functional groups.

11. A method according to claim 11 wherein the reinforcing polymer has a cross-linking site density of 30 to 50 percent of the functional groups.

12. A method according to claim 1 in which the base polymer is first cross-linked to itself and then to the reinforcing polymer.

13. A method according to claim 1 in which the base and reinforcing polymers are simultaneously cross-linked to each other.

14. A method according to claim 1 in which the gel is formed by:
  (i) forming an aqueous solution of a partly hydrolyzed polyacrylamide base polymer having a relatively low density of hydrolyzed amide groups as cross-linking sites,
  (ii) incorporating a reinforcing polymer comprising a polymer having a relatively high density of carboxylate groups as cross-linking sites into the solution,
  (iii) forming cross linkages between the polymers with a compound of a polyvalent metal as a cross-linking agent to form regions of relatively low density cross-linking and regions of clustered, high density cross-linking.

15. A method according to claim 14 in which the polyvalent metal is chromium (III).

16. A method according to claim 1 in which the concentration of the base polymer in the solution is from 500 to 10000 ppm and the amount of reinforcing polymer is from 0.1 to 10 percent by weight of the base polymer.

17. In a method for the enhanced recovery of oil by injecting a flooding liquid into a stratified, subterranean oil-bearing formation through an injection well extending from the surface of the earth into the formation, to displace oil from the formation to an offset production well, the improvement comprising:
  controlling the permeability of the formation by the selective placement of an aqueous heterogeneous polymer gel in more highly permeable regions of the formation, the gel being prepared prior to the injection thereof into the formation by cross-linking a mixture of a base polymer having a relatively low density of cross-linking sites and a reinforcing polymer having a relatively high density of cross-linking sites, the resulting gel comprising a cross-linked polymeric structure having isolated regions of relatively high density cross-linking in a continuous phase of relatively low density cross-linking, the gel having improved injectivity and gel strength.

18. A method according to claim 17 in which the base polymer comprises a polyacrylamide having a relatively low proportion of carboxylate functional groups.

19. A method according to claim 18 in which the reinforcing polymer comprises polyacrylic acid, a partly hydrolyzed polyacrylamide or a partly hydrolyzed polyacrylic acid ester.

20. A method according to claim 17 in which the cross-linkages are coordinate cross-linkages extending between ligand polymers and polyvalent metals as cross-linking agents.

21. A method according to claim 20 in which the polyvalent metal is chromium (III).

22. A method according to claim 17 in which the gel has a total polymer content of 500 to 10000 ppm.

23. A method according to claim 22 in which the gel has a total polymer content of 1000 to 5000 ppm.

24. A method according to claim 23 wherein the base polymer has a cross-linking site density of 1 to 10 percent of the functional groups.

25. A method of claim 24 wherein the base polymer has a cross-linking site density of 1 to 5 percent of the functional groups.

26. A method according to claim 25 wherein the reinforcing polymer has a cross-linking site density of at least 20 percent of the functional groups.

27. A method according to claim 26 wherein the reinforcing polymer has a cross-linking site density of 30 to 50 percent of the functional groups.

28. A method according to claim 17 in which the base polymer is first cross-linked to itself and then to the reinforcing polymer.

29. A method according to claim 17 in which the base and reinforcing polymers are simultaneously cross-linked to each other.

30. A method according to claim 17 in which the gel is prepared by:
  (i) forming an aqueous solution of a partly hydrolyzed polyacrylamide base polymer having a relatively low density of hydrolyzed amide groups as cross-linking sites,
  (ii) incorporating a reinforcing polymer comprising a polymer having a relatively high density of carboxylate groups as cross-linking sites into the solution,
  (iii) forming cross linkages between the polymers with a compound of a polyvalent metal as a cross-linking agent to form regions of relatively low density cross-linking and regions of clustered, high density cross-linking.

31. A method according to claim 30 in which the polyvalent metal is chromium (III).

32. A method according to claim 17 in which the concentration of the base polymer in the solution is from 500 to 10000 ppm and the amount of reinforcing polymer is from 0.1 to 10 percent by weight of the base polymer.

33. A method according to claim 32 in which the amount of reinforcing polymer is from 1 to 5 percent by weight of the base polymer.

34. A method according to claim 7 wherein the base polymer has a molecular weight of at least $1 \times 10^6$.

35. A method according to claim 34 wherein the base polymer has a molecular weight of at least $5 \times 10^6$ to $20 \times 10^6$.

36. A method according to claim 35 wherein the reinforcing polymer has a molecular weight of at least $1 \times 10^3$ to $10 \times 10^6$.

37. A method according to claim 36 wherein the reinforcing polymer has a molecular weight of at least $2 \times 10^3$ and not greater than $0.1 \times 10^6$.

38. A method according to claim 37 wherein molecular weight (number) ratio of the base polymer to the reinforcing polymer is 10,000:1 to 5:1.

39. A method according to claim 38 wherein molecular weight (number) ratio of the base polymer to the reinforcing polymer is 5,000:1 to 10:1.

40. A method according to claim 23 wherein the base polymer has a molecular weight of at least $1 \times 10^6$.

41. A method according to claim 40 wherein the base polymer has a molecular weight of at least $5 \times 10^6$ to $20 \times 10^6$.

42. A method according to claim 41 wherein the reinforcing polymer has a molecular weight of at least $1 \times 10^3$ to $10 \times 10^6$.

43. A method according to claim 42 wherein the reinforcing polymer has a molecular weight of at least $2 \times 10^3$ and not greater than $0.1 \times 10^6$.

44. A method according to claim 43 wherein molecular weight (number) ratio of the base polymer to the reinforcing polymer is 10,000:1 to 5:1.

45. A method according to claim 44 wherein molecular weight (number) ratio of the base polymer to the reinforcing polymer is 5,000:1 to 10:1.

* * * * *

UNITED STATES PATENT AND TRADEMARK OFFICE
CERTIFICATE OF CORRECTION

PATENT NO. : 4,834,182

DATED : May 30, 1989

INVENTOR(S) : Paul Shu

It is certified that error appears in the above-identified patent and that said Letters Patent is hereby corrected as shown below:

Col. 1, line 32, delete "theif" and insert --thief--.
Col. 4, line 8, delete first ",".
Col. 5, line 63, delete "petroleUm" and insert --petroleum--.
Col. 6, line 38, delete "the" after "will be".
Col. 8, line 10, delete "llarge" and insert --larger--.
Col. 10, line 35, delete "looding" and insert --flooding--.
Col. 12, line 42, delete "dep" and insert --deep--.
Col. 14, line 25, delete "inwhich" and insert -- in which--.

Signed and Sealed this

Sixteenth Day of July, 1991

Attest:

HARRY F. MANBECK, JR.

*Attesting Officer*   *Commissioner of Patents and Trademarks*